(12) United States Patent
Schmidt et al.

(10) Patent No.: US 6,215,994 B1
(45) Date of Patent: Apr. 10, 2001

(54) SYSTEM AND METHOD FOR OVER THE AIR PROGRAMMING OF MOBILE STATIONS

(75) Inventors: Paul Schmidt, Lynchburg; Thomas Gahagen, Forest, both of VA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/148,129

(22) Filed: Sep. 4, 1998

(51) Int. Cl.[7] .................................................. H04M 3/00
(52) U.S. Cl. ......................... 455/419; 455/519; 455/551
(58) Field of Search ..................................... 455/419, 551, 455/557, 519, 565

(56) References Cited

U.S. PATENT DOCUMENTS

| | | | |
|---|---|---|---|
| 5,014,345 | * 5/1991 | Comroe et al. | 455/54 |
| 5,276,729 | * 1/1994 | Higuichi et al. | 379/58 |
| 5,297,191 | * 3/1994 | Gerszberg | 455/419 |
| 5,418,524 | * 5/1995 | Fennell | 340/825.22 |
| 5,465,391 | * 11/1995 | Toyryla | 455/412 |
| 5,506,837 | 4/1996 | Söllner et al. | 370/296 |
| 5,603,084 | * 2/1997 | Henry, Jr. et al. | 455/33.1 |
| 5,758,291 | * 5/1998 | Grube et al. | 455/518 |
| 5,797,100 | * 8/1998 | Dettner | 455/518 |
| 5,940,752 | * 8/1999 | Henrick | 455/419 |
| 6,044,265 | * 3/2000 | Roach, Jr. | 455/419 |

* cited by examiner

Primary Examiner—Edward F. Urban
Assistant Examiner—Blano J. Jackson
(74) Attorney, Agent, or Firm—Wood, Phillips, VanSanten, Clark & Mortimer (57) ABSTRACT

A mobile station is provided for transmitting and receiving communication signals over the air. The mobile station includes a memory storing user preference information, a receiver adapted to receive an over-the-air information signal including user preference information, and a user preference program in the mobile station adapted to change the user preference information in the memory according to user preference information in a received over-the-air information signal. The mobile station is remote from a master control unit selectively activatible for transmitting the over-the-air information including select user preference information input at the master control unit.

22 Claims, 5 Drawing Sheets

| | 54 | 56 | 60 | 62 | 64 |
|---|---|---|---|---|---|
| 1 | GROUP NO. 1 | ALPHA TAG 1 | ROEF - 1 | RREF - 1 |
| 2 | GROUP NO. 2 | ALPHA TAG 2 | ROEF - 2 | RREF - 2 |
| 3 | GROUP NO. 3 | ALPHA TAG 3 | ROEF - 3 | RREF - 3 |
| | ○ | ○ | ○ | ○ |
| | ○ | ○ | ○ | ○ |
| | ○ | ○ | ○ | ○ |
| 25 | GROUP NO. 25 | ALPHA TAG 25 | ROEF - 25 | RREF - 25 |
| 26 | PHONE NO. 26 | ALPHA TAG 26 | | |
| 27 | PHONE NO. 27 | ALPHA TAG 27 | | |
| | ○ | ○ | | |
| | ○ | ○ | | |
| | ○ | ○ | | |
| 130 | PHONE NO. 130 | ALPHA TAG 130 | | |
| | DIAL LOCK | RECEIVE LOCK | | |

| | 54' | 56 | 60 | 62 | 64 |
|---|---|---|---|---|---|
| 1 | GROUP NO. 1 | ALPHA TAG 1 | ROEF - 1 | RREF - 1 |
| 2 | GROUP NO. 2 | ALPHA TAG 2 | ROEF - 2 | RREF - 2 |
| 3 | GROUP NO. 3 | ALPHA TAG 3 | ROEF - 3 | RREF - 3 |
| | ○ | ○ | ○ | ○ |
| | ○ | ○ | ○ | ○ |
| | ○ | ○ | ○ | ○ |
| 29 | GROUP NO. 29 | ALPHA TAG 29 | ROEF - 29 | RREF - 29 |
| 30 | GROUP NO. 30 | ALPHA TAG 30 | ROEF - 30 | RREF - 30 |
| 31 | PHONE NO. 31 | ALPHA TAG 31 | | |
| 32 | PHONE NO. 32 | ALPHA TAG 32 | | |
| | ○ | ○ | | |
| | ○ | ○ | | |
| | ○ | ○ | | |
| 126 | PHONE NO. 126 | ALPHA TAG 126 | | |
| 127 | PHONE NO. 127 | ALPHA TAG 127 | | |
| | DIAL LOCK | RECEIVE LOCK | | |

52, 58', 66, 68

SYSTEM AND METHOD FOR OVER THE AIR PROGRAMMING OF MOBILE STATIONS

FIELD OF THE INVENTION

The present invention is directed toward programming of mobile communication stations and, more particularly, toward programming mobile stations with user specific information.

BACKGROUND OF THE INVENTION

Programming of mobile stations is fairly well known. Upon purchasing a mobile station (e.g., a cellular phone), the user generally takes the phone to a service provider (Cellular One, U.S. Cellular, etc.) to have it activated. Upon the user opening an account, the service provider will program the user's phone with NAM (Number Assignment Module) information to configure the phone to operate within the system provided by the service provider. Once activated, if the user wishes to add enhanced features offered by the service provider, or to delete enhanced features for which the user has already subscribed, the user must take the mobile station to the service provider and have the enhanced features added to, or deleted from, his/her account.

Mobile stations also generally have the ability to receive NAM information over the air via an R-Data transport mechanism. NAM information is generally categorized into various levels, with only certain information transmittable, for security and other reasons, to the mobile station over the air. Transmission of NAM information over the air is not level dependent, but rather depends on the particular type of NAM information being sent. As previously noted, the NAM information generally controls how the mobile station interacts and accesses the cellular communication system within which it operates, such as, but not limited to, an IS-136 system.

For instance, a user purchasing a mobile station (e.g., a cellular phone) from a vendor may wish to activate his/her phone without having to physically take the phone to a service provider (Cellular One, U.S. Cellular, etc.) for activation. The service provider's service shop may be located geographically too far away from the user, or the user may simply not have the time to take the phone in and have it activated. The user has the option of contacting the service provider by phone, other than the purchased cellular phone, providing a credit card number and having the service provider activate their cellular phone over the air. Activation consists of the service provider basically downloading, over the air, the NAM information configuring the phone to interact within its system. This saves the user the time and inconvenience of having to physically travel to the service provider's service shop. Certain of the downloaded NAM information may also be changed in a similar manner. However, as previously noted, not all NAM information is transmittable over the air.

In the case of a company providing mobile stations such as cellular phones to its employees for work use, the company may not wish the employee to originate or receive calls when the employee takes a mobile station out of its home system, i.e., is roaming. Alternatively, the company may wish the employee to originate or receive only certain calls when the employee takes a mobile station out of its home system. Currently, the company must instruct the employee to physically bring the mobile station in to its service shop to have the mobile station reconfigured accordingly, since this type of user preference information is menu driven. This may provide great inconvenience to both the company and employees who are remotely located.

The same inconvenience is present for parents who may purchase mobile stations for their family members, i.e., their children. The parent of a child who is away at college and who is abusing his/her parents' generosity by making 900# calls, long distance calls, and the like, may have no choice other than to continue incurring these charges or have the service provider disable the phone. Since mobile stations are extremely helpful in emergency situations where a person may not have access to a conventional wire-line telephone, a parent may be hesitant in having the phone disabled, and may simply continue incurring the charges rung up by his/her child.

The present invention is directed toward overcoming one or more of the above-mentioned problems.

SUMMARY OF THE INVENTION

A mobile station is provided for transmitting and receiving communication signals over the air, the mobile station including a memory storing user preference information a receiver adapted to receive an over-the-air information signal including user preference information, and a user preference program in the mobile station adapted to change the user preference information in the memory according to user preference information in a received over-the-air information signal.

In one form, the receiver is adapted to receive over-the-air information signals across an R-data transport network.

In another form, the user preference information stored in the memory includes group phone number information and standard phone number information, and the user preference program is adapted to change the group phone number information and to change the standard phone number information responsive to a received user information signal.

In other forms, the group phone number information stored in the memory includes group phone numbers and alphanumeric identifiers associated with each group phone number.

In another form, the group phone number information further includes a roam receive enable flag and a roam origination enable flag for each group phone number, the roam receive enable flag selectively enabling/disabling receipt of a call at the mobile station from the group phone number with which it is associated, and the roam origination enable flag selectively enabling/disabling origination of a call at the mobile station to the group phone number with which it is associated.

In other forms, the standard phone number information stored in the memory includes standard phone numbers and alphanumeric identifiers associated with each standard phone number.

In another form, the user preference program is also adapted to add and delete group phone numbers to the memory responsive to a received user information signal.

In still another form, a preselected amount of the memory is allocated for storing the group phone number information, and the user preference program is adapted to increase the selected amount of memory allocated responsive to a received user information signal with added group phone numbers.

In yet another form, the user preference information stored in the memory includes receive lock user preference information selectively settable to restrict the mobile station's ability to receive incoming calls, and dial lock user preference information selectively settable to restrict the mobile station's ability to place outgoing calls, and the user preference program is adapted to change the receive lock and dial lock user preference information responsive to a received user preference signal.

A system is also provided for selectively controlling the ability of a mobile station to place and/or receive calls, the system including a master control unit selectively activatible for transmitting an over-the-air information signal including select user preference information defining the ability of a select mobile station to place and/or receive calls. A mobile station remote from the master control unit includes a memory storing user preference information for the mobile station, a receiver adapted to receive an over-the-air information signal from the master control unit, and a user preference program adapted to change the user preference information in the memory according to select user preference information received in an over-the-air information signal from the master control unit.

In one form, the master control unit transmits the over-the-air information signal across an R-data transport network.

In another form, the user preference information includes group phone number information and standard phone number information, and the user preference program is adapted to change the group phone number information and the standard phone number information in the memory responsive to a received information signal.

In still another form, the group phone number information further includes a roam receive enable flag and a roam origination enable flag for each group phone number, the roam receive enable flag selectively enabling/disabling receipt of a call at the mobile station from the group phone number with which it is associated, and the roam originate enable flag selectively enabling/disabling origination of a call at the mobile station to the group phone number with which is it associated.

In yet another form, the user preference information stored in the memory includes receive lock user preference information selectively settable to restrict the mobile station's ability to receive incoming calls, and dial lock user preference information selectively settable to restrict the mobile station's ability to place outgoing calls, with the user preference program being adapted to change the receive and dial lock user preference information responsive to a received information signal.

In another form, the master control unit includes a user controllable input device for selectively inputting user preference information defining the ability of a select mobile station to place and/or receive calls, and a messaging center receiving the input user preference information from the user controllable input device and transmitting the over-the-air information signal, including the user preference information, to the select mobile station.

In still another form, the user controllable input device includes a computer having a display, a memory and a user input apparatus for controlling operation of the computer, and a user preference reconfigure program operating in the computer.

In another aspect of the invention, in a mobile station for use in a wireless communication system including a memory storing user preference information, a method is provided for automatically changing the user preference information stored in the memory including the steps of (a) receiving an over-the-air information signal including user preference information, and (b) automatically changing the user preference information in the memory according to the user preference information in the received over-the-air information signal.

In one form, the user preference information stored in the memory includes group phone number information and standard phone number information, and step (b) includes the step of automatically changing the group phone number information and/or the standard phone number information responsive to the received user information signal.

In another form, the group phone number information stored in the memory includes group phone numbers, a roam receive enable flag for each group phone number, the roam receive enable flag selectively enabling/disabling receipt of a call at the mobile station from the group phone number with which it is associated, and a roam origination enable flag for each group phone number, the roam origination enable flag selectively nabling/disabling origination of a call at the mobile station to the group phone number with which it is associated.

In another form, the standard phone number information includes standard phone numbers.

In still another form, a selected amount of memory is allocated for storing the group phone number information, and step (b) includes the step of automatically changing the selected amount of memory responsive to the received user information signal.

In yet another form, the user preference information stored in the memory includes receive lock user preference information selectively settable to restrict the mobile station's ability to receive incoming calls, and dial lock user preference information selectively settable to restrict the mobile station's ability to place outgoing calls, wherein step (b) includes the step of automatically changing the receive lock and dial lock user preference information responsive to the received user preference signal.

A method is also provided for selectively controlling the ability of a mobile station to place and/or receive calls. The method includes the steps of transmitting, at a master control unit, an over-the-air information signal including select user preference information defining the ability of a select mobile station to place and/or receive calls receiving, at the select mobile station, the transmitted over-the-air information signal including the select user preference information, and automatically changing the user preference information in the memory according to the select user preference information in the received over-the-air information signal.

It is an object of the present invention to provide improved control of the use of a mobile station.

It is a further object of the present invention to permit an owner to selectively control the use of its mobile stations by others.

It is another object of the present invention to permit an owner to quickly and easily configure its mobile stations for use.

It is yet a further object of the present invention to permit an owner to easily restrict an employee's personal use of employer owned mobile stations.

It is still a further object of the present invention to minimize costs associated with employer owned mobile stations.

Other aspects, objects and advantages of the present invention can be obtained from a study of the application, the drawings, and the appended claims.

DETAILED DESCRIPTION OF THE PREFERRED EMBODIMENT

Figure 1:
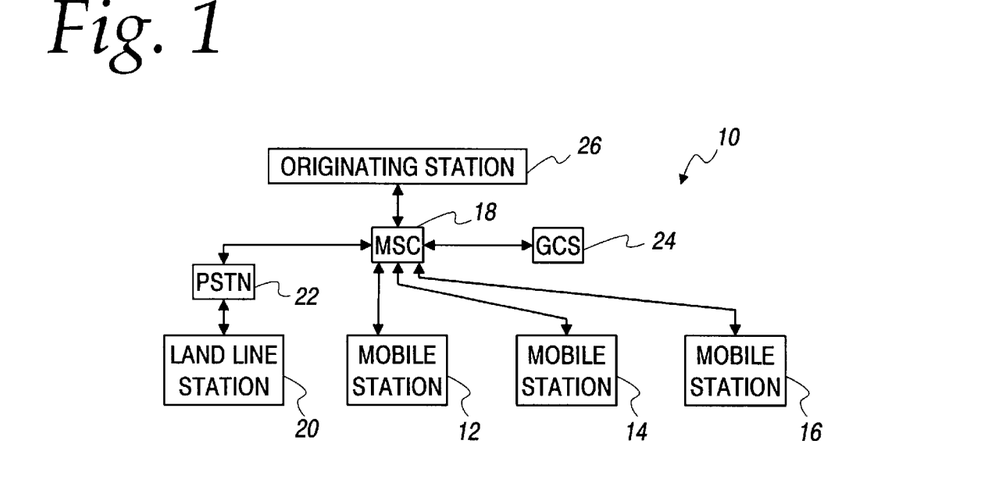
FIG. 1 is a block diagram of a standard communication system in which the present invention may be utilized.

Referring to FIG. 1, a communication system, shown generally at 10, is illustrated in which the present invention may be utilized. Mobile stations 12,14,16 may communicate with one another via a Mobile Switching Center (MSC) 18. For convenience, the base station and base station controller, which establish the communication link between the mobile stations 12,14,16 and the MSC 18 have been omitted in FIG. 1. The mobile stations 12,14,16 may also communicate with a land-line station 20 via a Public Switching Telephone Network (PSTN) 22.

A Group Call Server (GCS) 24 communicates with the MSC 18. The GCS 24 is essentially a conference calling bridge and can be a shared resource among many MSC's 18 within the communication system 10.

The GCS 24 permits group phone calls to be made between numerous terminating units, whether they be mobile stations, land-line phones, etc. A group phone call is essentially a conference call between at least three parties. A group may include land-line stations, mobile stations, and/or any type of communication device that has a dialable 10-digit number and is accessible through a cellular network and/or a PSTN. The GCS 24 has a group member database (not shown) that includes each group phone number and a list of all of the individual phone numbers of the various members within the particular group.

Assume that a particular group includes mobile stations 12,14,16, land-line station 20 and originating station 26 as its members. The originating station 26 may be a mobile station communicating with the MSC 18 via a base station (not shown), or a land-line station communicating with the MSC 18 via a PSTN (not shown). When the originating station 26 places a call to the group by dialing the group phone number, the group phone number is transmitted to the MSC 18. The GCS 24 receives the group phone number from the MSC 18 and identifies the various members of the group in its database, and generates a separate call to each group member through the MSC 18. The MSC 18 then routes the separate calls to each of the terminating units, namely, mobile stations 12,14,16 and land-line station 20. As the call to each terminating unit is connected, the GCS 24 includes a voice path to the conference call bridge.

Figure 2:
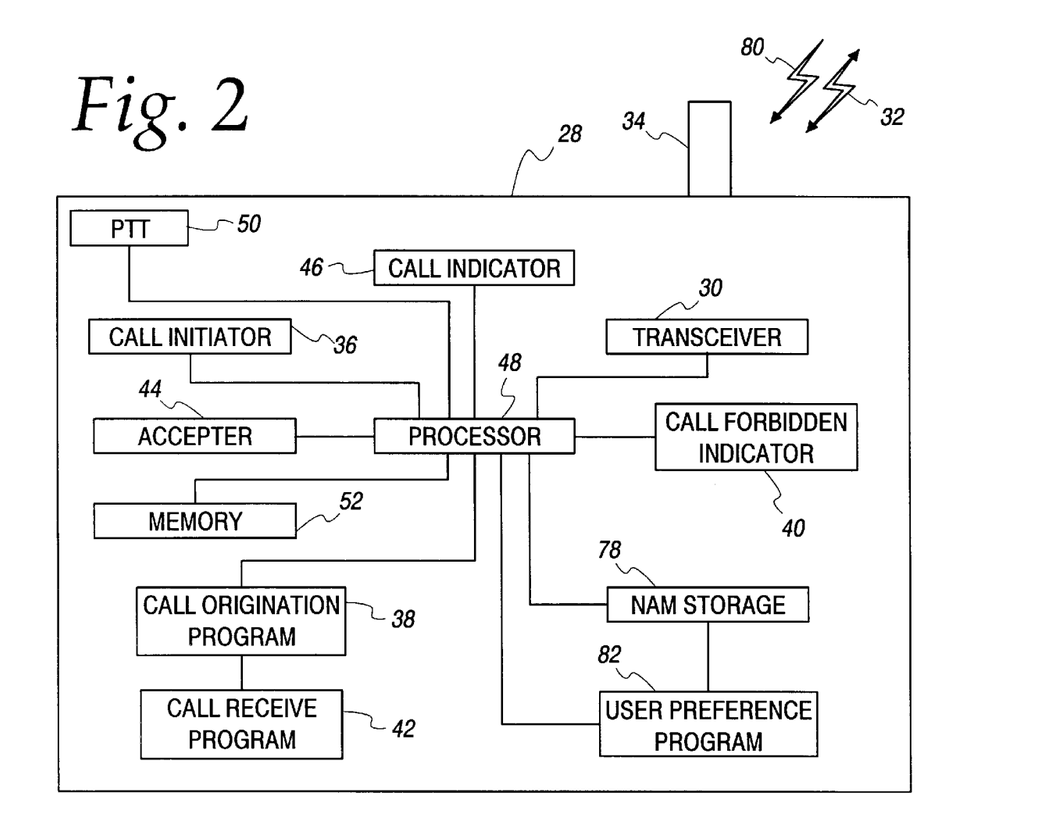
FIG. 2 is a block diagram of the inventive mobile station.

Referring to FIG. 2, a mobile station according to the invention is shown at 28. The mobile station 28 includes a transceiver 30 for transmitting and receiving communication signals 32 via antenna 34; a call initiator 36 for initiating calls by a user; a call origination program 38 determining which outgoing calls may be transmitted; a call forbidden indicator 40 responsive to the call origination program 38 informing the user that a particular outgoing call is forbidden; a call receive program 42 determining which calls may be received by the mobile station 28; an accepter 44 responsive to the call receive program 42 permitting the mobile station 28 to accept certain incoming calls; and a call indicator 46 responsive to the accepter 44 informing the user that it has an incoming call. Operation of all of the above-identified elements are controlled by a processor 48.

The mobile station 28 may also include a Push-To-Talk (PTT) button 50 permitting the mobile station 28 to be employed in much the same way as dispatch radios. For instance, transmission occurs when the PTT button 50 is depressed, which unmutes a microphone (not shown) and mutes a speaker (not shown) on the mobile station 28, thus permitting the user to transmit a voice signal. When the PTT button 50 is released, the microphone is muted and the speaker is unmuted so that the user may listen to incoming voice signals.

The mobile station 28 also includes a memory 52 which is also controlled by the processor 48. The memory 52 is a storage area utilized as a phone book where users may program both phone numbers and alphanumeric tags (alpha tags) (e.g., names) associated with these numbers. The memory 52 is preferably a non-volatile memory surviving power-up and power-down of the mobile station 28.

Figure 3:
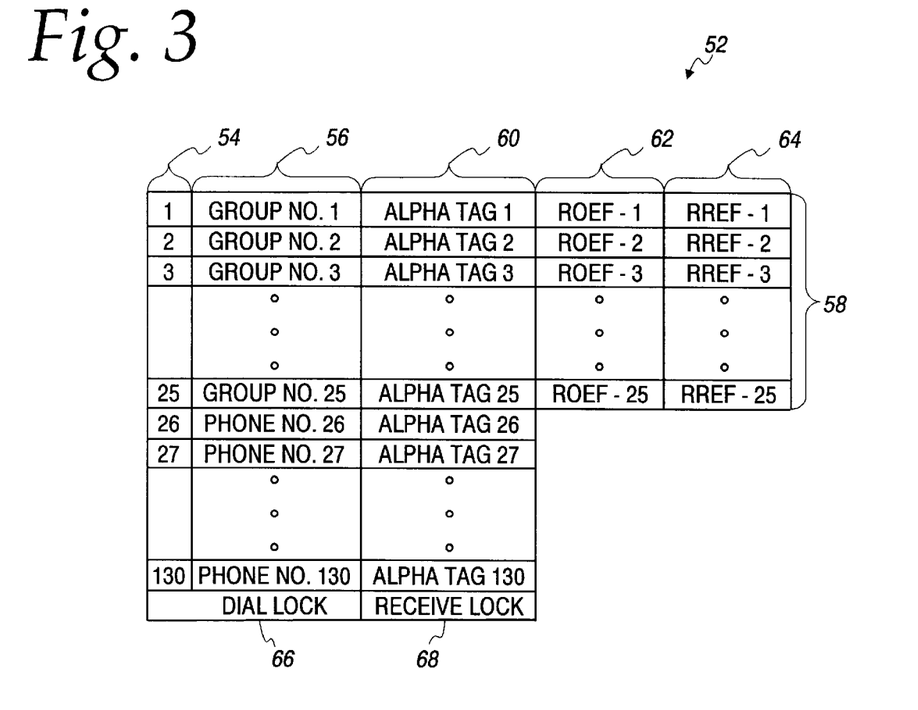
FIG. 3 is an expanded diagram of the memory shown in FIG. 2.

FIG. 3 illustrates the structure of the memory 52. The memory 52 includes a first area 54 for storing a memory location identified number. A second area 56 stores the phone numbers. As illustrated in FIG. 3, the first twenty five memory locations, i.e., group memory area 58, have been allocated for group phone numbers, while the remaining memory locations (26–130) are utilized for conventional phone numbers, although other allocation schemes could be used with the present invention. A third area 60 stores the alpha tags associated with each phone number. The alpha tags are a string of alphanumeric characters which are generally set by the user to readily identify particular phone numbers. A fourth area 62 stores a Roam Origination Enable Flag (ROEF) for each of the group phone numbers. The ROEF may be a binary bit having two states, "0" and "1". With the ROEF in state "1", roam origination is enabled and the mobile station 28 may place a group call to that particular group phone number while roaming. With the ROEF in state "0", the mobile station 28 may not place a group call to that particular group phone number while roaming.

A fifth area 64 in the memory 52 stores the Roam Receive Enable Flag (RREF) for each group phone number. The RREF may also be a binary bit having two states, "0" and "1". With the RREF in state "1", roam receive is enabled and the mobile station 28 may accept a group call from that particular group phone number while roaming. With the RREF in state "0", roam receive is disabled and the mobile station 28 may not receive a group call from that particular group phone number while roaming. Of course, the enable and disable states of the ROEF and RREF may be reversed.

The memory 52 also stores a dial lock 66 and a receive lock 68. The dial 66 and receive 68 locks are selectively settable for further controlling use of the mobile station 28.

The dial lock 66 restricts the mobile station's 28 ability to originate, or dial out, outgoing calls. Various selections may be activated to restrict outgoing calls in the dial lock 66 of the mobile station 28; these include, but are not limited to:

(a) allow all (can dial any number);

(b) restrict all (cannot dial any number);

(c) local+800# (thus restricts roaming calls);

(d) memory only;

(e) local+800# +memory only;

(f) restrict international calls;

(g) restrict 900# calls;

(h) restrict operator calls; and (i) group only (can only originate calls from group memory area 58 [locations 1–25 in FIG. 3] with ROEF=1).

The receive lock 68 controls the ability of the mobile station 28 to receive incoming calls. Various selections may be activated in the receive lock 68 to selectively permit the mobile station 28 to receive only certain calls; these include, but are not limited to:

(a) allow all;

(b) prohibit all;

(c) memory only (so a call is accepted only if the caller line ID in the paging message matches a phone number stored in any of the memory locations); and (d) group only (so a call is accepted only if the caller line ID in the paging message matches a group telephone number having a RREF=1).

The caller line ID feature is a well-known feature which identifies to a cellular phone user, or to a land-line phone user if they have a caller line ID attachment device, who has originated an incoming call. The user to whom the call is destined learns the identity of the call originator through the caller line ID field, which includes the call originator's phone number, or group phone number if the call is to a particular group, and which is transmitted to the destined user in the page message of an incoming call.

It should be noted that the ROEF and RREF only come into play if the mobile station 28 is in a roaming condition. Roaming essentially means that the mobile station 28 is out of its home system. The concept of roaming is illustrated in FIG. 4.

Figure 4:
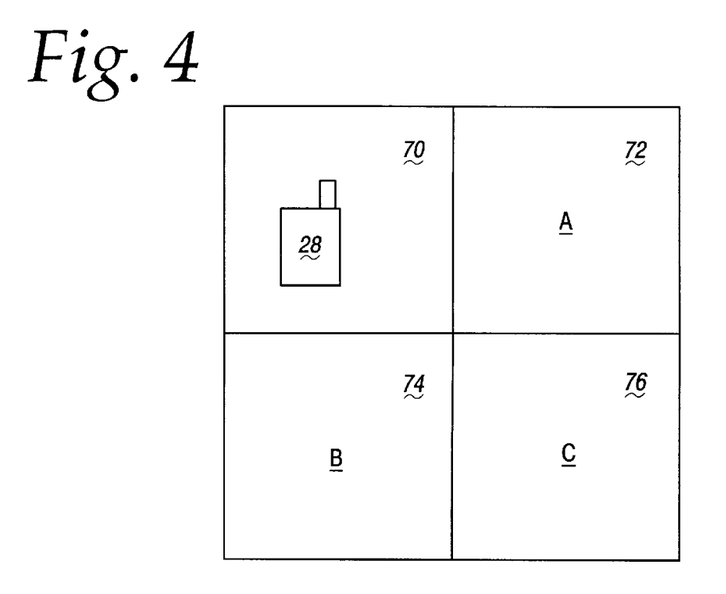
FIG. 4 depicts four separate wireless communication systems and illustrates roaming of the mobile station in separate systems.

FIG. 4 depicts four separate wireless communication systems, or cellular systems, 70,72,74,76. Each system 70,72,74,76 services a different geographical area and, accordingly, includes distinct geographical boundaries. When a mobile station is within the geographical boundaries of a particular communication system, it will use that particular communication system to transmit and receive its calls.

To illustrate how roaming occurs, it is assumed that the mobile station 28 has system 70 as its home system; that is, the user of mobile station 28 has an account with communication system 70. When the mobile station 28 travels outside of the geographical boundaries of system 70, it is considered to be roaming. That is, if the mobile station 28 travelled to position A, it would be roaming in system 72; if the mobile station 28 travelled to position B, it would be roaming in system 74; and, similarly, if the mobile station 28 travelled to position C, it would be roaming in system 76.

Referring back to FIG. 2, the mobile station 28 includes a NAM storage area 78 for storing NAM (Number Assignment Module) information. NAM information configures the terminal, or mobile station, to operate within the network or system. NAM information is not concerned with how the mobile station 28 operates via a user interface.

The mobile station 28 has the ability to receive NAM information over the air via an R-Data transport network, which can be considered the information highway upon which the NAM information travels. The NAM information message transmitted over the air differs from an SMS (Short Message Service) by an informational element in the header at the beginning of the data stream that identifies it as an OAA (Over the Air Activation) message. The mobile station 28 looks at the informational element in the header and identifies the incoming information as either SMS or OAA, and treats the data appropriately.

The inventive mobile station 28 also has the ability to receive user data, or preference, information over the air via signal 80. This user data information is also preferably transmitted via the existing R-Data transport network, and consists of the various phone numbers (group and standard) and dial and receive lock information previously described with respect to FIG. 3. Accordingly, when receiving the signal 80 via the R-Data transport network, a user preference program 82 in the mobile station 28, which has access to the NAM storage area 78 and is controlled by the processor 48, determines whether the signal 80 includes NAM information or user data information and processes the signal 80 (the data therein) accordingly.

Prior to discussing operation of the user preference program 82, generation and transmission of the user data information across the R5 Data transport network will be discussed.

Figures 5, 6:
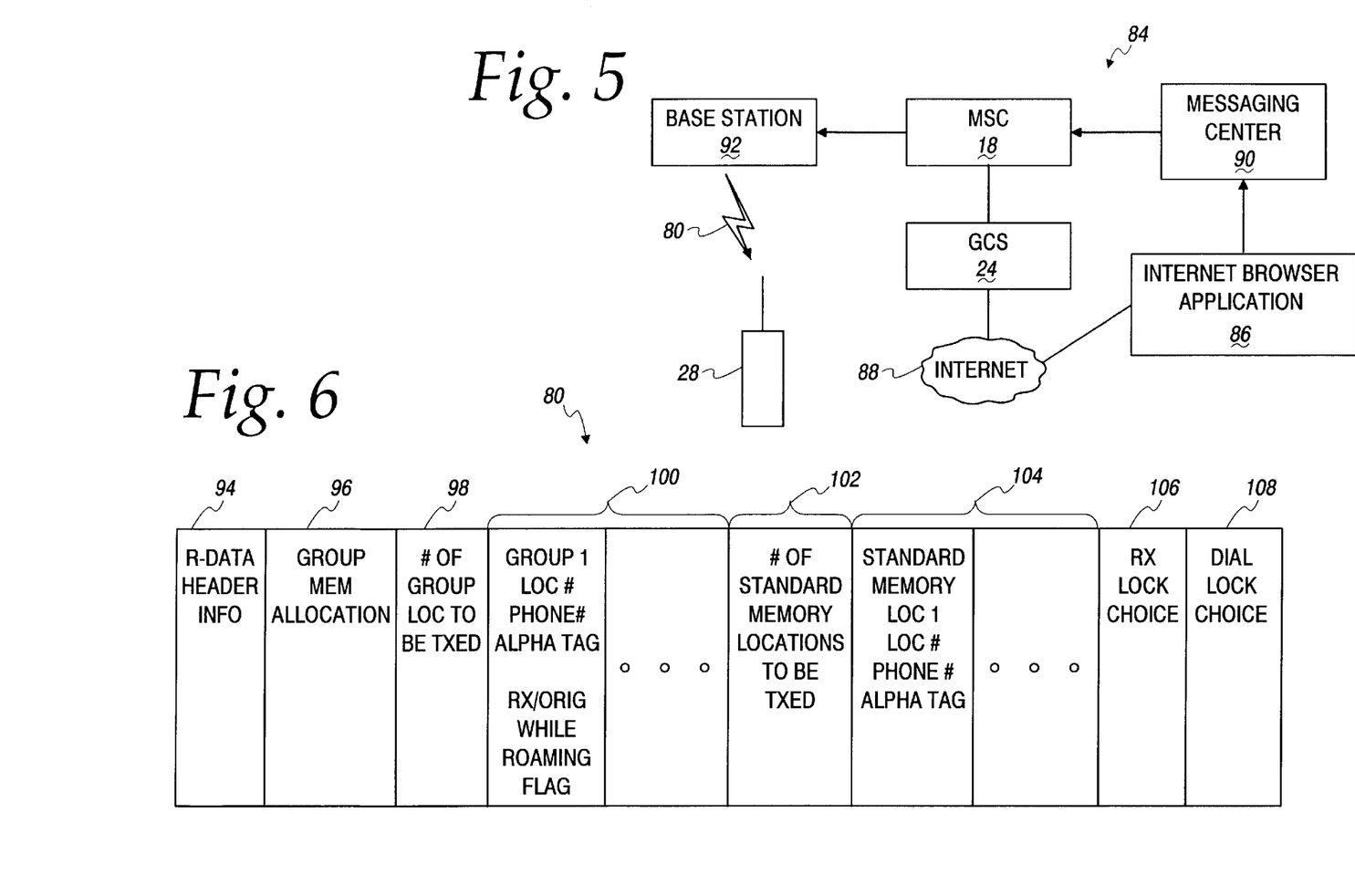
FIG. 5 is a block diagram of the system for generating and transmitting user data information across an R-Data transport network to a mobile station.
FIG. 6 illustrates an exemplary structure of the signal including the user data information transmitted by the system shown in FIG. 5.

Referring to FIG. 5, a system for generating and transmitting user data information across the R-Data transport network is shown generally at 84. The basic premise is that an individual remote from the mobile station 28 may wish to configure or restrict the use of the mobile station 28. For example, a company which has provided cellular phones to its employees may want to restrict the use of its cellular phones by its employees. The company may wish to restrict particular phones to originating or receiving only certain calls (group calls or standard calls), and/or may wish to set different dial and receive lock features on each phone such as discussed above. With the present invention, instead of each employee having to bring his/her cellular phone in to the company's or the service provider's service shop for reconfiguration, the company is able to download this user preference information over the air to each particular cellular phone and essentially control the use of its mobile stations.

In a preferred form, an Internet browser application 86 is included in a computer (not shown) remote from the mobile station 28. Most likely, the computer would be located on the company premises. The Internet browser application 86 has a link to the GCS 24 via the Internet 88 and is able to look into the GCS 24 database and view the various groups and members of each group stored therein, permitting an employer to access the GCS 24 database and add/delete groups and/or add/delete members within a group. After modifying the GCS 24 database, the modified information is passed on to pertinent mobile station(s) 28 via messaging center 90, MSC 18, base station 92, and over the air signal 80.

For example, assume group A included members a, b, c, and d. If the employer wanted to further include members e and f within group A, the employer would access the GCS 24 via the Internet browser application 86 and Internet 88 and reconfigure the GCS 24 database to include members e and f within group A, by adding phone numbers for members e and f to group A. Accordingly, should member "a" subsequently initiate a call to group A, the GCS 24 would route page messages to members b, c, d, e and f.

The employer also informs a messaging center 90 of this change, and the messaging center 90 uses the R-Data transport network to send a signal 80 (the specifics of which will be described later) to members e and f, via the MSC 18 and base station 92, including sufficient group information to include group A in the memory 52 of their mobile stations 28. Note that members a, b, c and d need not receive any signal since presumably they would already have the phone number, and other pertinent information, for group A stored in the memory of their respective mobile stations.

As a further example, assume group B includes members x, y and z. Further, assume that the employer wants to modify group B to only include members w, x and y. The employer accesses the GCS 24, via the Internet browser application 86 and Internet 88, and modifies group B by adding the phone number for member w to Group B, and deleting the phone number for member z from Group B. This modification is also transmitted from the Internet browser application 86 to the messaging center 90, which then transmits appropriate signals to members w and z as previously described. Member w would receive sufficient group information to include him/her within group B, while member z would have all information relative to group B deleted from its memory.

Modification of the other user preference information stored in the memory 52 (see FIG. 3), including the standard phone numbers, associated alpha tags, dial lock 66 and receive lock 68, is effectuated in a similar manner as previously described, the only difference being that since this other information is not group relation, the GCS 24 need not be accessed.

FIG. 6 illustrates the structure of signal 80 including the user data information transmitted by the messaging center 90 to the mobile station 28 across the R-Data transport network. (Signal 80 is received at the mobile station 28 and routed to the user preference program 82 via the processor 48.) The signal 80 generally includes a number of data fields of varying lengths, including a header field 94 (1 byte), a group memory allocation field 96 (1 byte), a number field for transmitted group locations 98 (1 byte), transmitted group information 100 (20 bytes per group), a number field for transmitted standard locations 102 (1 byte), transmitted standard information 104 (19 bytes per standard location), a receive lock field 106 (1 byte) and a dial lock field 108 (1 byte). The above-identified fields all contain user data information to configure the mobile station 28 for operation via a user interface. It should be noted that the above-identified byte lengths for each field are exemplary only and other bit/byte field lengths are contemplated.

Operation of the user preference program 82 will now be described with reference to FIGS. 2, 3, 6 and 7. Upon receipt of signal 80 (block 110), the user preference program 82 analyzes the header information 94 to determine if the signal 80 contains user data information (block 112). If the user preference program 82 determines from the header information 94 that the signal 80 is a NAM information signal, the signal is routed to the NAM storage area 78 (block 114) and processed accordingly.

Figure 7:
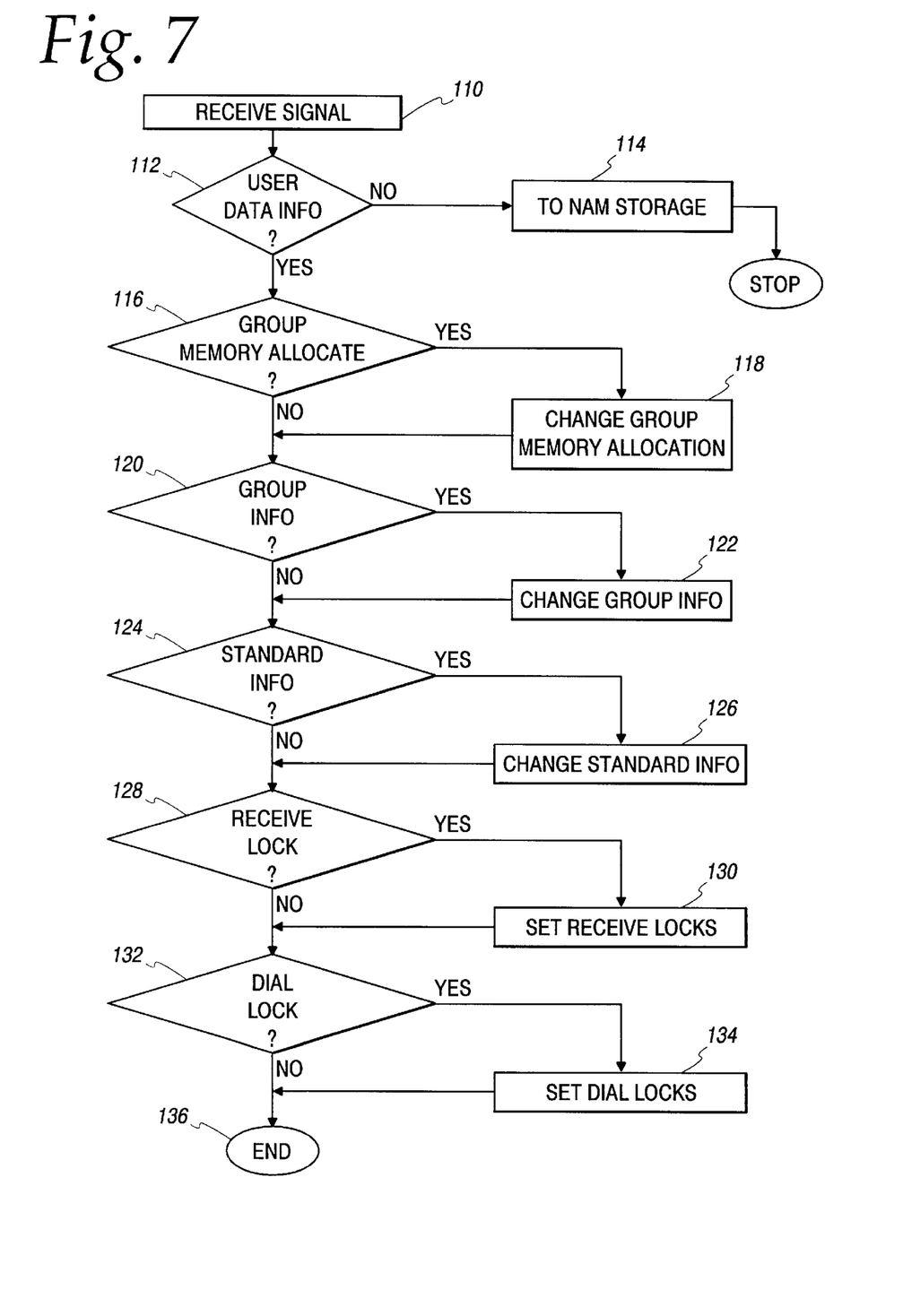
FIG. 7 is a flow chart illustrating receipt and processing of the signal including user data information by the mobile station shown in FIG. 2.

If it is determined at block 112 that the header 94 indicates that the signal 80 contains user data information, the group memory allocation field 96 is analyzed to determine if additional group memory area 58 should be allocated for additional group phone numbers (block 116). If a value other than 0 is found in the group memory allocation field 96 (in the example illustrated in FIG. 3, this value would also be no greater than 130 since 130 memory locations are included in memory 52, the user preference program 82 allocates that much memory toward group information (block 118). For instance, if the group memory allocation field 96 contains the number 30, the user preference program 82 allocates an additional five memory locations for group information at block 118, thus bringing the total number of group memory locations to 30. It should be noted that allocations toward group memory come from the standard memory locations, although not necessarily in a one-to-one correspondence.

Figure 8:
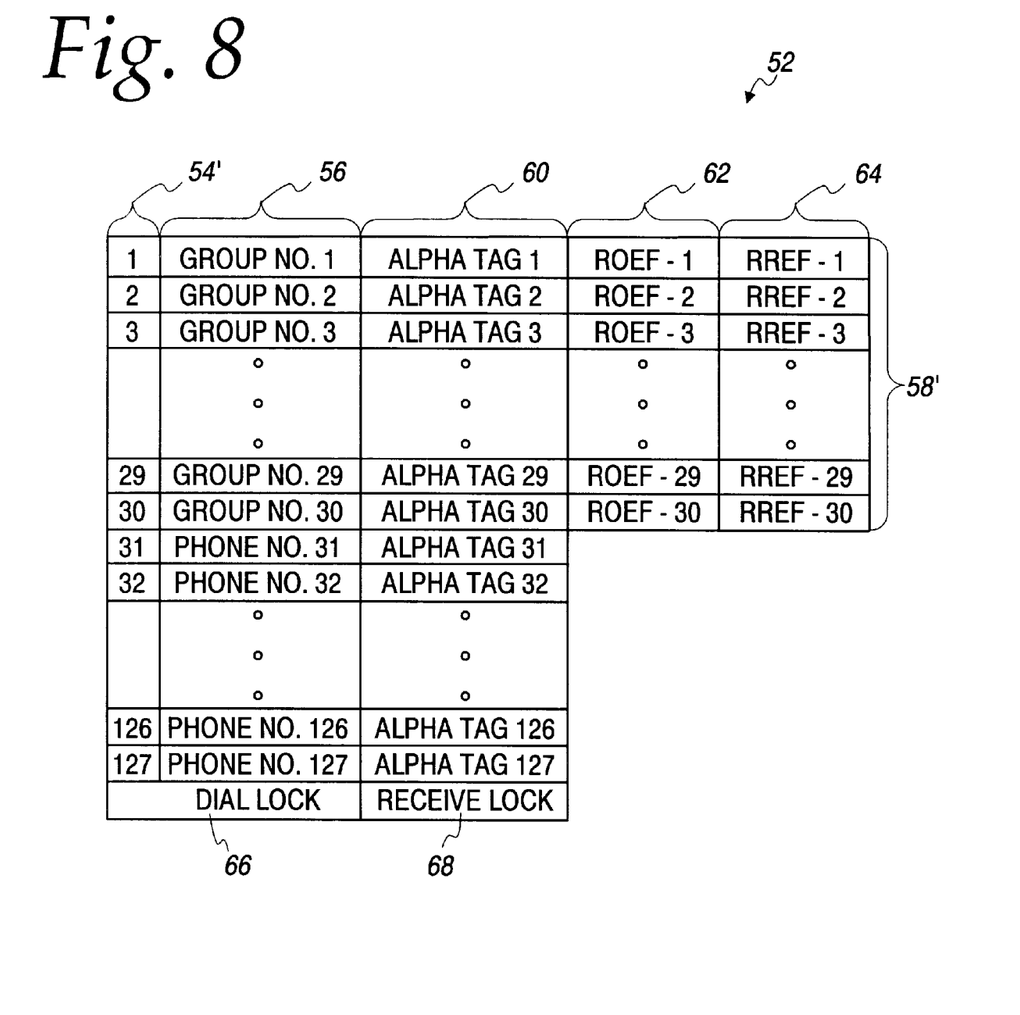
FIG. 8 is an expanded diagram of a modified version of the mobile station memory.

FIG. 8 represents an exemplary allocation structure of memory 52 after the re-allocation previously described. Note that the group memory area 58' has increased to 30 group memory locations, while the total number of memory locations has decreased to 127 (since the group numbers require more memory), resulting in a decrease in the number of standard memory locations.

If a 0 is found in the group memory allocation field 96 at block 116, this indicates that the current group memory allocation is fine and the user preference program 82 proceeds to block 120 and determines if any group information has been transmitted by analyzing the information in the transmitted group location field 98. If, for instance, a 2 is found in field 98, the user preference program 82 knows that information pertaining to two groups is included in the signal. Since 20 bytes of information are generally allocated per group, the user preference program 82 knows to look at the next 20 bytes for information pertaining to the first group transmitted, and the next 20 bytes for information pertaining to the second group transmitted (block 122). As shown in FIG. 3, the group information consists of location number 54, group phone number 56, alpha tag 60, ROEF 62, and RREF 64.

After the group information has been changed at block 122, or if it is determined at block 120 that no groups have been transmitted (0 found in field 98), the user preference program 82 determines if any standard memory locations have been transmitted at block 124 by analyzing field 102. If a value other than 0 is found in field 102, the user preference program 82 knows that information relevant to a certain number of standard memory locations have been transmitted and proceeds to block 126. For example, if a 5 is transmitted in field 102, the user preference program 82 knows that information relevant to five standard memory locations has been transmitted. Since 19 bytes are generally allocated for each standard memory location, the user preference program 82 knows to look at the next 95 bytes (5×19) for information pertaining to the transmitted standard memory locations at block 126. The standard information consists of location number 54, standard phone number 56 and alpha tag 60.

After the user preference program 82 has changed the standard information at block 126, or if it is determined at block 124 that no standard memory locations have been transmitted (0 found in field 102), the user preference program 82 then analyzes the receive lock choice field 106 at block 128.

If it is determined at block 128 that the receive lock selections are to be modified, the user preference program 82 proceeds to block 130 and sets the appropriate selections in the receive lock 68. After completion, or if it is determined at block 128 that no modifications are required (0 found in receive lock field 106), the user preference program analyzes the dial lock choice field 108 at block 132.

If it is determined at block 132 that the dial lock selections are to be modified, the user preference program 82 proceeds to block 134 and sets the appropriate selections in the dial lock 66. After completion, or if it is determined at block 1 32 that no modifications are required (0 found in dial lock field 108), the user preference program 82 ends (block 136).

It should be noted that the byte allocation in the previously described example is exemplary only, and the specific configuration of the signal 80 may be rearranged without departing from the spirit and scope of the present invention.

It should further be noted that the mobile station 28 is generally provided with a security code which must be entered before any of the information contained in memory 52 can be changed. This security code is not disclosed to employees so that they may not reconfigure their mobile stations for their own private use. Upon sensing that the signal 80 includes user preference information, the user preference program 82 can either bypass or mimic the security code allowing the user preference information in memory 52 to be changed according to the transmitted information in the signal 80.

The present invention provides an owner with improved control over the use of its mobile stations. An owner is able to configure and reconfigure its mobile stations for use without having to have the mobile station physically brought into the service shop and/or require response from the service provider. This is particularly useful to employers who have provided their employees with mobile stations and whose employees are abusing this privilege through extensive personal use of the employer's mobile stations. The employer is able, at their convenience, to easily and quickly configure selected mobile stations to only accept and/or transmit calls to certain numbers, and can all be done without the employee physically bringing the phone in to the service shop of the employer to have it reconfigured. Thus, an employer is able to minimize its costs associated with such mobile stations.

While the invention has been described with particular reference to the drawings, it should be understood that various modifications could be made without departing from the spirit and scope of the present invention.

What is claimed is:

1. A mobile station for transmitting and receiving communication signals over the air, said mobile station comprising:

a memory storing user preference information including group phone number information and standard phone number information wherein the group phone number information includes group phone numbers and an alphanumeric identifier associated with each group phone number;

a receiver adapted to receive an over-the-air information signal including user preference information; and a user preference program in the mobile station adapted to change the group phone number information in the memory and to change the standard phone number information in the memory according to user preference information in a received over-the-air information signal.

2. A mobile station for transmitting and receiving communication signals over the air, said mobile station comprising:

a memory storing user preference information including group phone number information and standard phone number information wherein the group phone number information stored in the memory includes group phone numbers and a roam receive enable flag and a roam origination enable flag for each group phone number, said roam receive enable flag selectively enabling/disabling receipt of a call at the mobile station from the group phone number with which it is associated, and said roam origination enable flag selectively enabling/disabling origination of a call at the mobile station to the group phone number with which it is associated;

a receiver adapted to receive an over-the-air information signal including user preference information; and a user preference program in the mobile station adapted to change the group phone number information in the memory and to change the standard phone number information in the memory according to user preference information in a received over-the-air information signal.

3. A mobile station for transmitting and receiving communication signals over the air, said mobile station comprising:

a memory storing user preference information including group phone number information and standard phone number information wherein the standard phone number information stored in the memory includes standard phone numbers;

a receiver adapted to receive an over-the-air information signal including user preference information restricting the ability of the mobile station to place and/or receive calls to and from selected numbers; and a user preference program in the mobile station adapted to change the group phone number information in the memory and to change the standard phone number information in the memory according to user preference information in a received over-the-air information signal.

4. The mobile station of claim 3, wherein the receiver is adapted to receive over-the-air information signals across an R-data transport network.

5. The mobile station of claim 3, wherein the standard phone number information further includes an alphanumeric identifier associated with each standard phone number.

6. The mobile station of claim 3, wherein the user preference program is also adapted to add and delete group phone numbers to the memory responsive to a received user information signal.

7. A mobile station for transmitting and receiving communication signals over the air, said mobile station comprising:

a memory storing user preference information, the user preference information including group phone number information and standard phone number information and the group phone number information including group phone numbers;

a receiver adapted to receive an over-the-air information signal including user preference information; and a user preference program in the mobile station adapted to change the group phone number information and the standard phone number information in the memory according to user preference information in a received over-the-air information signal and to add and delete group phone numbers to the memory responsive to a received over-the-air information signal, wherein a selected amount of the memory is allocated for storing the group phone number information, and said user preference program is adapted to increase the selected amount of memory allocated responsive to a received over-the-air information signal with added group phone numbers.

8. A mobile station for transmitting and receiving communication signals over the air, said mobile station comprising:

a memory storing user preference information including receive lock user preference information selectively settable to restrict the mobile station's ability to receive incoming calls from a first set of selected numbers, and dial lock user preference information selectively settable to restrict the mobile station's ability to place outgoing calls to a second set of selected numbers;

a receiver adapted to receive an over-the-air information signal including user preference information; and a user preference program in the mobile station adapted to change the user preference information in the memory according to user preference information in a received over-the-air information signal including changing the receive lock and dial lock user preference information responsive to a received over-the-air information signal.

9. The mobile station of claim 8, wherein the user preference information stored in the memory includes group phone number information and standard phone number information, and wherein the user preference program is adapted to change the group phone number information and to change the standard phone number information responsive to a received user information signal.

10. The mobile station of claim 9, wherein the group phone number information stored in the memory includes group phone numbers.

11. A system for selectively controlling the ability of a mobile station to place and/or receive calls, said system comprising:

a master control unit selectively activatable for transmitting an over-the-air information signal including select user preference information defining the ability of a select mobile station to place and/or receive calls; and a mobile station remote from the master control unit including a memory including a selected amount allocated to storing user preference information for the mobile station;

a receiver adapted to receive an over-the-air information signal from the master control unit; and a user preference program in the mobile station adapted to change the user preference information in the memory according to select user preference information in an over-the-air information signal received from the master control unit and to change the selected amount of memory allocated to storing user preference information responsive to a change in the user preference information.

12. The system of claim 11, wherein the master control unit transmits the over-the-air information signal across an R-data transport network.

13. The system of claim 11, wherein:

the user preference information includes group phone number information and standard phone number information, and the user preference program is adapted to change the group phone number information and the standard phone number information in the memory responsive to a received information signal.

14. The system of claim 13, wherein the group phone number information includes group phone numbers.

15. A system for selectively controlling the ability of a mobile station to place and/or receive calls, said system comprising:

a master control unit selectively activatable for transmitting an over-the-air information signal including select user preference information defining the ability of a select mobile station to place and/or receive calls including group phone number information and standard phone number information, said group phone number information including group phone numbers and a roam receive enable flag and a roam origination enable flag for each group phone number; and a mobile station remote from the master control unit including a memory storing user preference information for the mobile station:

a receiver adapted to receive an over-the-air information signal from the master control unit; and a user preference program in the mobile station adapted to change the user preference information in the memory according to select user preference information in an over-the-air information signal received from the master control unit, including changing the group phone number information and the standard phone number information in the memory responsive to a received information signal, wherein said roam receive enable flag selectively enables/disables receipt of a call at the mobile station from the group phone number with which it is associated, and said roam originate enable flag selectively enables/disables origination of a call at the mobile station to the group phone number with which is it associated.

16. The system of claim 15, wherein the master control unit comprises:

a user controllable input device for selectively inputting user preference information defining the ability of a select mobile station to place and/or receive calls; and a messaging center receiving the user preference information input from the user controllable input device and transmitting the over-the-air information signal, including the user preference information, to the select mobile station.

17. The system of claim 16, wherein the user controllable input devices comprises a computer having a display, a memory, a user input apparatus for controlling operation of the computer, and a user preference reconfigure program.

18. A system for selectively controlling the ability of a mobile station to place and/or receive calls, said system comprising:

a master control unit selectively activatible for transmitting an over-the-air information signal including select user preference information defining the ability of a select mobile station to place and/or receive calls to and from selected numbers; and a mobile station remote from the master control unit including a memory storing user preference information for the mobile station;

a receiver adapted to receive an over-the-air information signal from the master control unit; and a user preference program in the mobile station adapted to change the user preference information in the memory according to select user preference information in an over-the-air information signal received from the master control unit;

wherein the user preference information stored in the memory includes receive lock user preference information selectively settable to restrict the mobile station's ability to receive incoming calls from said selected numbers, and dial lock user preference information selectively settable to restrict the mobile station's ability to place outgoing calls to said selected numbers., and the user preference program is adapted to change the receive and dial lock user preference information responsive to a received information signal.

19. A method of automatically changing user preference information stored in the memory of a mobile station for use in a wireless communication system, said method comprising the steps of:

(a) receiving an over-the-air information signal including user preference information which includes group phone number information and standard phone number information, said mobile station allocating a selected amount of memory for storing the group phone number information, and (b) automatically changing the group phone number information and/or the standard phone number information responsive to the received user information signal, including automatically changing the selected amount of memory responsive to the received user information signal.

20. A method of automatically changing user preference information stored in the memory of a mobile station for use in a wireless communication system, said method comprising the steps of:

(a) receiving an over-the-air information signal including user preference information wherein the user preference information stored in the memory includes receive lock user preference information selectively settable to restrict the mobile station's ability to receive incoming calls from a first set of selected numbers, and dial lock user preference information selectively settable to restrict the mobile station's ability to place outgoing calls to a second set of selected numbers; and (b) automatically changing the receive lock and dial lock user preference information in the memory responsive to the received user preference signal according to the user preference information in the received over-the-air information signal.

21. The method of claim 20, wherein the user preference information stored in the memory includes group phone number information and standard phone number information, and wherein step (b) comprises the step of automatically changing the group phone number information and/or the standard phone number information responsive to the received user information signal.

22. A method of selectively controlling the ability of a mobile station to place and/or receive calls, the mobile station including a memory storing user preference information, said method comprising the steps of:

transmitting, at a master control unit, an over-the-air information signal including select user preference information restricting the ability of a select mobile station to place and/or receive calls to and from selected numbers;

receiving, at the select mobile station, the transmitted over-the-air information signal including the select user preference information; and automatically changing the user preference information in the memory according to the select user preference information in the received over-the-air information signal; and restricting the ability of the select mobile station to place and/or receive calls to and from the selected numbers.

* * * * *